(12) United States Patent
Takeya

(10) Patent No.: US 7,127,470 B2
(45) Date of Patent: Oct. 24, 2006

(54) DOCUMENTS CONTROL APPARATUS THAT CAN SHARE DOCUMENT ATTRIBUTES

(75) Inventor: Kazutoshi Takeya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 533 days.

(21) Appl. No.: 10/600,342

(22) Filed: Jun. 23, 2003

(65) Prior Publication Data

US 2004/0083433 A1  Apr. 29, 2004

(30) Foreign Application Priority Data

Jun. 24, 2002 (JP) ............................ 2002-183347
Jun. 17, 2003 (JP) ............................ 2003-172487

(51) Int. Cl.
  G06F 7/00 (2006.01)
  G06F 17/00 (2006.01)
  G06F 17/30 (2006.01)

(52) U.S. Cl. .......................... 707/102; 707/10; 707/8

(58) Field of Classification Search ................ 707/201, 707/10, 100, 102, 8, 3; 715/315
  See application file for complete search history.

(56) References Cited

U.S. PATENT DOCUMENTS

| | | | | |
|---|---|---|---|---|
| 6,578,053 | B1 * | 6/2003 | Kidokoro et al. | 707/201 |
| 2003/0105782 | A1 * | 6/2003 | Brodersen et al. | 707/201 |
| 2004/0060006 | A1 * | 3/2004 | Lindblad et al. | 715/513 |

FOREIGN PATENT DOCUMENTS

| | | |
|---|---|---|
| JP | 7-85007 | 3/1995 |
| JP | 8-16553 | 1/1996 |
| JP | 2002-123506 | 4/2002 |
| JP | 2002-140344 | 5/2002 |

OTHER PUBLICATIONS

Anderson et al., "Replication, Consistency, and Practicality: Are These Mutually Exclusive?", SIGMOD Conference, pp. 484-495; 1998, ACM.*
U.S. Appl. No. 10/600,342, filed Jun. 23, 2003, Takeya.
U.S. Appl. No. 10/691,691, filed Oct. 24, 2003, Matsuishi.
U.S. Appl. No. 09/288,856, filed Apr. 9, 1999, Fujita et al.
U.S. Appl. No. 09/472,249, filed Dec. 27, 1999, Shimada et al.
U.S. Appl. No. 10/600,342, filed Jun. 23, 2003, Takeya.

* cited by examiner

*Primary Examiner*—Jeffery Gaffin
*Assistant Examiner*—Michael J. Hicks
(74) *Attorney, Agent, or Firm*—Oblon, Spivak, McClelland, Maier & Neustadt, P.C.

(57) ABSTRACT

A documents control apparatus includes an attribute sharing unit that shares an attribute of a document with another documents control apparatus, an edit processing unit that edits the attribute, and a switching unit that determines whether the attribute is shared with the other documents control apparatus. The switching unit switches the edit of the attribute based on the determination. If the attribute sharing unit does not share the attribute, the switching unit allows the edit processing unit to edit the attribute as requested. If the attribute sharing unit shares the attribute, the switching unit controls the operation of the edit processing unit.

22 Claims, 13 Drawing Sheets

FIG.2

ATTRIBUTE "ABC"

| ITEM NAME | ITEM TYPE |
|---|---|
| DATE PRINTED | DATE |
| CHECKED BY | NAME |
| DRAWING | STRING |

FIG.3

ATTRIBUTE "XYZ"

| ITEM NAME | ITEM TYPE |
|---|---|
| LAST DATE PRINTED | DATE |
| CHECKED BY | NAME |
| DRAWING | NUMERICAL VALUE |
| CUSTOMER CODE | NUMERICAL VALUE |

FIG.4

ATTRIBUTE OF DOCUMENT "DOC 1"

| ATTRIBUTE | xyz ▼ |
|---|---|
| | abc ▲ |
| | def |
| | ghi |
| | ⋮ ▼ |

FIG.5

ATTRIBUTE OF DOCUMENT "DOC 1"

| ATTRIBUTE | abc ▼ |
|---|---|
| DATE PRINTED | 1989/3/3 |
| CHECKED BY | SUZUKI |
| DRAWING | Type 5 |

FIG.6A

| ATTRIBUTE NAME | ATTRIBUTE ID | POINTER TO DETAILED INFORMATION | SHARED |
|---|---|---|---|
| SCANNER | B41-0f32 | | ○ |
| FACSIMILE RECEPTION | B42-0f32 | | × |
| PRINT | B43-0f32 | | ○ |
| ... | ... | ... | ... |

FIG.6B

| ITEM NAME | ITEM TYPE | ITEM VALUE STORAGE NO. |
|---|---|---|
| DOCUMENT NAME | STRING | C-1 |
| DOCUMENT NUMBER | NUMERICAL VALUE | N-1 |
| DATE REGISTERED | DATE | D-1 |
| DATE UPDATED | DATE | D-3 |
| ... | ... | ... |

FIG.7

BIBLIOGRAPHIC INFORMATION TABLE

| | |
|---|---|
| | DOCUMENT A |
| | ATTRIBUTE ID: B41-0F32 |
| C-1 | DOC 1 |
| C-2 | — |
| | — |
| | ⋮ |
| D-1 | 1988/3/4 |
| D-2 | — |
| D-3 | 1999/6/15 |
| | ⋮ |
| N-1 | 5/3 |
| | ⋮ |

FIG.15

ATTRIBUTE EDIT HISTORY INFORMATION

DOCUMENT ATTRIBUTE ID, NO. 1

2003/6/9 ; 10:00　RENAME ATTRIBUTE NAME, ABC, XYZ
2003/6/9 ; 10:21　RENAME ITEM NAME 1, DATE PRINTED, LAST NAME PRINTED
2003/6/9 ; 10:25　CHANGETYPE ITEMTYPE 3, STRING, NUMERICAL VALUE
2003/6/9 ; 10:42　ADD ITEM 4, CUSTOMER CODE, NUMERICAL VALUE

...

DOCUMENTS CONTROL APPARATUS THAT CAN SHARE DOCUMENT ATTRIBUTES

BACKGROUND OF THE INVENTION

1. Field of the Invention

The present invention generally relates to a documents control apparatus that controls electronic documents (documents), and more particularly, to a documents control apparatus that can share the attributes of documents with another documents control apparatus so as to search, classify, and control the documents based on their attributes.

2. Description of the Related Art

Conventionally, documents control apparatuses that control electronic documents (documents) are known.

In such a documents control apparatus, a method of supporting the analysis of documents by searching, classifying, and controlling the documents based on their bibliographic information such as the title, the drafting date, and the updating date of the documents is known. A method of supporting the analysis of documents by attaching keywords and/or a portion of the documents to the documents as the bibliographic information is also known. A method of automatically extracting the keywords and/or the portion of the documents, which makes the registration of the documents to the system easy, is also known.

There are documents control apparatuses that allow a user to define information to be associated with the documents in addition to information already prepared in advance.

As is described above, in the case of the documents control apparatus according to related art, the user can define attributes including an attribute item and its type. When or after registering a document, the user can input the attribute of the document or can cause the documents control apparatus to automatically input the attribute of the document.

A method of defining an attribute by combining a plurality of items of the bibliographic information and the other associated information described above is known. In this method, the name of the new attribute is defined, and a plurality of items and their data types are designated. According to the above method, it is possible to increase or decrease the items, and edit the items and their data types, if necessary. When registering and updating the documents, the user can select the item and input a value that fits the data type of the item.

A method of searching a document using the bibliographic information and attribute of the document is conventionally known. Using this method, the user can designate a search condition and extract documents that satisfy the search condition. Further, a method of classifying, and analyzing, documents based on the bibliographic information and attribute of the documents is also known.

A system in which two or more documents control apparatuses share the attributes of documents is also known.

Also known is a system that, when a document is copied or moved, for example, between documents control apparatuses, if the receiving documents control apparatus already has the same attribute as that of the document, the same attribute is assigned to the document; if the receiving documents control apparatus does not have the same attribute, an existing attribute or a newly generated attribute is assigned to the document (see Japanese Patent Laid-open Application No. 2002-123506).

Furthermore, a method of copying the attribute of the document, in the case that the receiving documents control apparatus does not have the same attribute as that of the document to be copied or moved is known.

Japanese Patent Laid-open Application No. 8-16553 discloses an invention in which a plurality of document processing apparatuses share and edit a document file. When the document processing apparatus edits and modifies a document file, the document processing apparatus requests a control apparatus that retains the document file to lock the modified document data page and corresponding page control table. The control apparatus, in response to the request, locks the modified document data page and the corresponding page control table, and prohibits another document processing apparatus from accessing them. The control apparatus updates them and unlocks them. The control apparatus informs the other document filing apparatuses opening the document file of the information of the update.

Japanese Patent Laid-open Application No. 7-85007 describes an invention in which when a plurality of document processing apparatuses access a document stored in a control apparatus, the document processing apparatus determines whether the document is accessible. When a document processing apparatus that is authorized to access the document accesses the document, the control apparatus protects the document from undesired modification by controlling the history of access executed by each document processing apparatus.

Japanese Patent Laid-open Application No. 2002-140344 discloses an invention in which a control apparatus receives from a document processing apparatus the information of editing a document and corresponding comments, and updates the document based on the information of the edit. At the same time, the control apparatus extracts the information of updating by comparing the document before and after the update, and stores the information of updating and corresponding comments as the history of the update. A plurality of document processing apparatuses connected with each other via a network can efficiently edit and update the document, and control the history of updates by, in response to a request from a user, displaying the information of updating and corresponding comments.

In the case of such a conventional system, if the attribute of documents commonly shared by a plurality of documents control apparatuses is changed by a documents control apparatus, the other documents control apparatuses can no longer share the attribute of the documents since the documents control apparatus no longer has the same attribute. In addition, the user cannot know which attribute is shared. Accordingly, the user does not know whether, if the user edits the attribute of a specific document, the edit affects the sharing of the attribute of the specific document, and how the attribute of the specific document is to be edited so as not to affect the sharing.

SUMMARY OF THE INVENTION

Accordingly, it is a general object of the present invention to provide a novel and useful documents control apparatus in which one or more of the problems described above are eliminated.

Another and more specific object of the present invention is to provide a documents control apparatus that allows the user to edit the document attribute with the sharing relationship sustained or prohibits the user from performing edit in which the sharing relationship is lost based on whether the document attribute is shared and which documents control apparatus shares the document attribute.

To achieve one or more of the above objects, a documents control apparatus that can share, with another documents control apparatus, an attribute attached to a document, includes an attribute sharing unit that shares said attribute with said other documents control apparatus; an edit processing unit that edit processes said attribute; and a switching unit that determines whether said attribute is shared with said other documents control apparatus by said attribute sharing unit and, based on the determination, controls edit processing on said attribute by said edit processing unit.

If the switching unit determines that the attribute sharing unit does not share the attribute of the document with another documents control apparatus, the switching unit allows the edit processing unit to edit the attribute as requested by the user. If, however, the switching unit determines that the attribute sharing unit shares the attribute of the document with the other documents control apparatus, the switching unit controls the operation of the edit processing unit.

The documents control apparatus may be further provided with an attribute identification information setting unit that sets attribute identification information of said attribute for identifying the attribute. If the edit processing is the deletion of an attribute item or the change of item type, for example, the attribute identification information setting unit is required to set different identification information to the edited attribute.

According to another aspect of the present invention, the edit processing unit can prevent itself from editing the attribute so as not to let the attribute identification information setting unit change the attribute identification information set for identifying the attribute.

According to yet another aspect of the present invention, the documents control apparatus is further provided with a display unit and displays a message that, if the attribute is edited, the edit processing unit needs to change the attribute identification information.

According to yet another aspect of the present invention, the documents control apparatus is further provided with an edit processing informing unit that informs the other documents control apparatus or apparatuses sharing the attribute of the contents of the edit so that it/they can perform the same edit by itself (or themselves).

According to yet another aspect of the present invention, the documents control apparatus may be further provided with an edit history information generating unit that generates edit history information of the edit, and an edit history information transmitting unit that transmits the generated edit history information to the other documents control apparatus or apparatuses sharing the attribute so that the other documents control apparatus or apparatuses sharing the attribute can perform the same edit.

According to yet another aspect of the present invention, the attribute identification information setting unit provided in the documents control apparatus does not change the attribute identification information set to the attribute even if it is required to reset the attribute identification information.

Other objects, features, and advantages of the present invention will become more apparent from the following detailed description when read in conjunction with the accompanying drawings.

BRIEF DESCRIPTION OF THE DRAWINGS

FIG. 2 illustrates the attribute of a document that is used in the documents control apparatus of FIG. 1;

FIG. 3 illustrates the edit of the attribute of FIG. 2;

FIG. 4 illustrates processing by an attribute attaching unit 6 of FIG. 1;

FIG. 5 illustrates processing by an attribute editing unit 4 of FIG. 1;

FIG. 6 illustrates the data structure of the document attribute stored in an attribute storing unit 5 of FIG. 1;

FIG. 7 illustrates a bibliographic information table stored in the attribute storing unit 5 of FIG. 1;

FIG. 15 illustrates an attribute edit history information; and

DETAILED DESCRIPTION OF THE PREFERRED EMBODIMENTS

Preferred embodiments of the present invention are described below with reference to the drawings.

Figure 1:
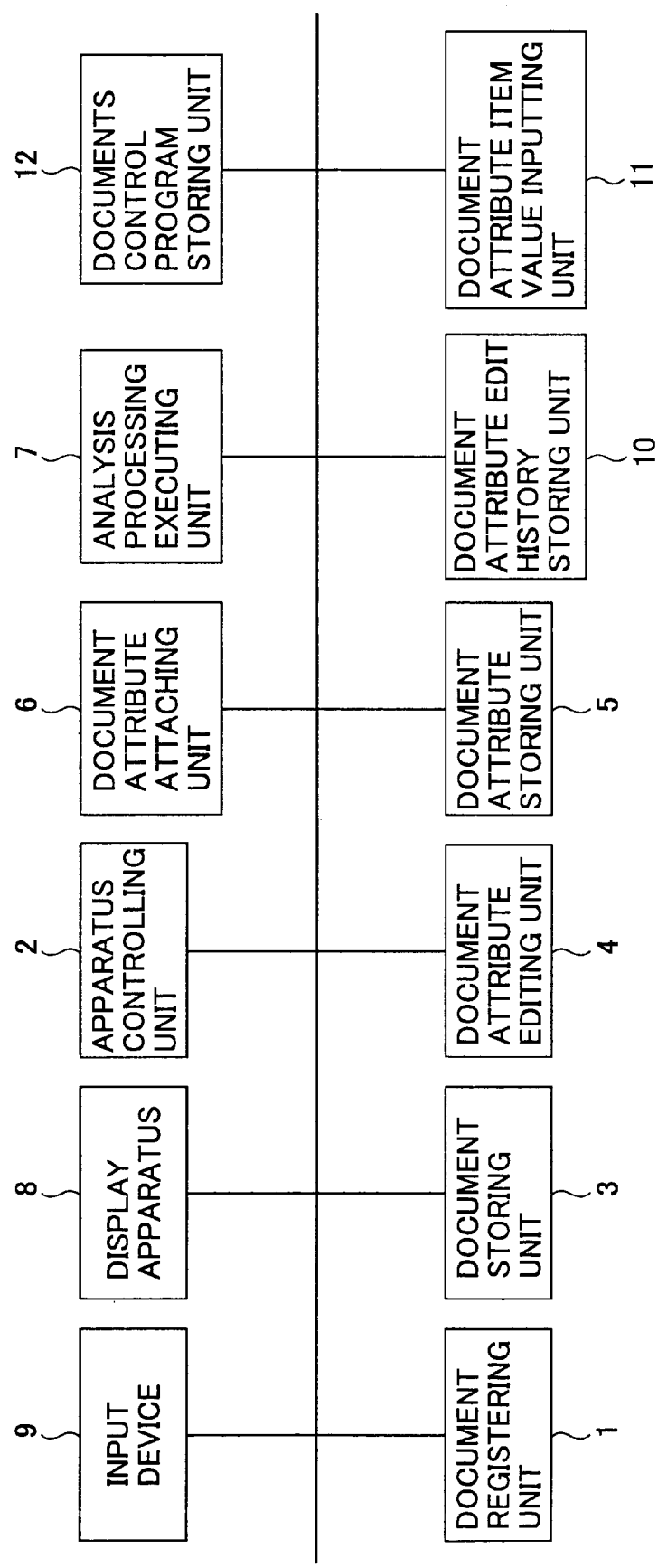
FIG. 1 is a block diagram showing a document control apparatus according to an embodiment of the present invention.

FIG. 1 is a block diagram showing a documents control apparatus (documents processing apparatus) according to an embodiment.

This documents control apparatus may be an ordinary personal computer that constructs the following: a document registering unit 1, a controlling unit (apparatus controlling unit) 2, a document storing unit 3, an attribute editing unit (document attribute editing unit) 4, an attribute storing unit (document attribute storing unit) 5, an attribute attaching unit (document attribute attaching unit) 6, an analysis processing executing unit 7, a display apparatus 8, an input device 9, an edit history storing unit (document attribute edit history storing unit) 10, an attribute item value inputting unit (document attribute item value inputting unit) 11, and a documents control program storing unit 12. These components embody the functions of the present invention such as a documents control unit, an attribute attaching unit, an item type defining unit, a naming unit, an item value inputting unit, an edit processing unit, a document copying unit, an attribute sharing unit, an attribute identification information setting unit, a switching unit, a display unit, an edit processing informing unit, an edit history information generating unit, and an edit history information transmitting unit.

The document registering unit 1 is constructed by an input device such as a scanner, a camera, and a keyboard, or a network connection apparatus with which the user can register (input) electronic documents (documents).

The controlling unit 2 is constructed by a Central Processing Unit (CPU) and a memory such as a Read Only Memory (ROM) and a Random Access Memory (RAM). The controlling unit 2 stores documents registered by the document registering unit 1 in the document storing unit 3, controls documents stored in the document storing unit 3, and controls the entire system of the documents control apparatus.

The document storing unit 3 is constructed by a nonvolatile memory, a hard disk apparatus, and/or a secondary storage apparatus.

The attribute editing unit 4 is a unit for defining the name of attributes (document attribute) that are attached to each document, the name of items of attributes and their data types. The attribute editing unit 4 stores the defined document attribute (attribute information) in the attribute storing unit 5 as a table. The attribute editing unit 4 also can retrieve and edit the document attribute once stored in the attribute storing unit 5.

The attribute storing unit 5 is constructed by a nonvolatile memory, a hard disk apparatus, and/or a secondary storage apparatus in a manner similar to the document storing unit 3.

The attribute attaching unit 6 is an apparatus that correlates a document retrieved from the document storing unit 3 and a document attribute retrieved from the attribute storing unit 5. The attribute attaching unit 6 also can substitute values to items of the document attribute. The controlling unit 2 stores the document and document attribute correlated by the attribute attaching unit 6 in the document storing unit 3.

After the user sets the condition of search and/or classification, the analysis processing unit 7 retrieves documents from the document storing unit 3, and executes the designated search and classification. The result of the search and classification is the shown on the display apparatus 8.

The input device 9 is a keyboard, for example, with which the user can register a document, edit the attribute of documents, attach a document attribute to documents, execute an analysis, and set attribute ID, for example. The result of the above operations is shown by the display apparatus 8. The display apparatus 8 and the input device 9 may be built in the documents control apparatus, or may be provided physically separate from the documents control apparatus.

The edit history storing unit 10, in the case that a document attribute is edited, and the attribute ID (attribute identification information) of the document attribute shared with another documents control apparatus is changed, stores the history of the edit therein as a file.

Although not shown in FIG. 1, the result of the analysis of documents can be output by an output device such as a printer in addition to the display apparatus 8.

The attribute item value inputting unit 11, when the item value of the document attribute is input or modified, displays a document attribute item value inputting screen, and stores the item value inputted by the user in a bibliographic information table.

A documents control program storing unit 12 is a CD-ROM drive or a DVD-RAM drive, for example, to read a computer readable recording medium storing documents control program according to the present invention, or may be a hard disk drive (HDD) in which the documents control program is already installed. The documents storing unit 3, the attribute storing unit 5, and the documents control program storing unit 12 may be constructed by the same hardware.

The network connection apparatus included in the document registering unit 1 can be connected with other documents control apparatuses via a network such as LAN. Accordingly, the documents control apparatus can exchange (copying and moving) documents and share document attributes with another documents control apparatus.

FIG. 2 illustrates an attribute used in this documents control apparatus.

FIG. 2 shows a document attribute "abc". One can use any name for a document attribute. The document attribute may include a plurality of items. Each item is accompanied by a data type. The data type may be "date" indicating a date, "name" indicating a name of a person, and "string" indicating an arbitrary character string.

The document attributes can be stored in the attribute storing unit 5. The attribute editing unit 4 can retrieve the document attribute stored in the attribute storing unit 5 and edit it.

FIG. 3 illustrates the edit of the document attribute shown in FIG. 2.

As is shown in FIG. 3, the name of the document attribute is changed from "abc" to "xyz", the name of the item "date printed" is changed to "last date printed", and the data type of the item "drawing" is changed from "string" to "number". A new item "customer code" of the data type "number" is added in the document attribute "xyz". Instead of adding an item, any item included in the document attribute may be deleted. It is possible to delete the document attribute "abc" as a whole.

FIG. 4 illustrates processing by an attribute attaching unit 6 of FIG. 1.

As is shown in FIG. 4, the document attribute "xyz" is attached to a document "doc 1" stored in or retrieved from the document storing unit 3. If necessary, one can change the document attribute attached to the document "doc 1" from "xyz" to "abc". As showed in FIG. 5, after attaching the document attribute "abc" to the document "doc 1", one can input a value to each item of the document attribute "abc".

The edited document attribute can be correlated with the document "doc 1" and the attribute and document stored in the document storing unit 3 together.

The data structure of the document attribute stored in the attribute storing unit 5 of the documents control apparatus is described below with reference to FIGS. 6A and 6B.

FIG. 6A illustrates a document attribute control data table. When the list of the document attributes is shown on the display device 8, the document attribute control data table may be referred to.

An attribute ID is information for identifying a document attribute. The documents control apparatus uses the attribute ID to identify the document attribute. For example, when a new document attribute is stored in the attribute storing unit 5, the documents control apparatus compares the attribute ID of the new document attribute with the attribute IDs of which document attributes are already stored in the document attribute control data table.

A "shared" flag indicates whether the document attribute is shared with another documents control apparatus. As shown in FIG. 6A, the attribute "scanner", for example, is shared with another document control apparatus.

A "pointer to detailed information" is a pointer indicating the reference to an attribute detailed information table shown in FIG. 6B. A table name and a file name may be used as the pointer.

The attribute detailed information table of FIG. 6B retains information, such as items included in the document attribute. An "item value storage number" indicates the correspondence between each item and the location of a value in a bibliographic information table of each document.

FIG. 7 illustrates a bibliographic information table.

The document attribute ID "B41-0F32" of a document "A" in the bibliographic information table shown in FIG. 7 indicates that the document attribute of the document "A" is "scanner". Because FIG. 6B indicates that the "document name" is stored in the "item value storage number" C-1, and "doc 1" is stored in C-1, the documents control apparatus can determine that the "document name" is. "doc 1". Likewise, one can also determine that the "registration date" and "document number" are "1988/3/4" and "5/3", respectively, by checking the "item value storage number" D-1 and N-1.

The "item value storage number" of FIG. 6B can be set by the user, or may be set by the controlling unit 2 by allocating an open "item value storage number".

When a plurality of documents control apparatuses share the document attribute, each documents control apparatus retains an attribute detailed information table shown in FIG. 6B corresponding to a record of the document attribute control data table so as to share the document attribute.

Figure 8:
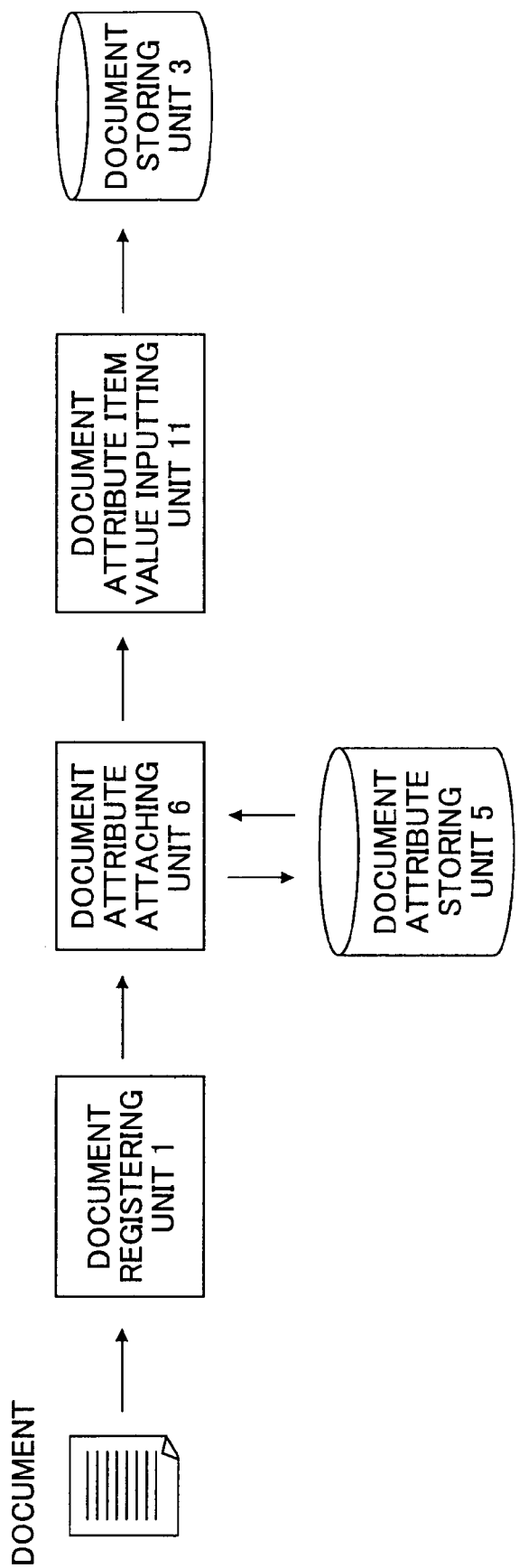
FIG. 8 is a schematic diagram showing registration processing of the documents control apparatus of FIG. 1.

FIG. 8 is a schematic diagram for explaining registration processing. A document is registered by the document registering unit 1 as a document file. Specifically, a bibliographic information table is generated for the document, and minimum information such as the name of the document and a document ID required for identifying the document is registered in the bibliographic table of the document.

A document attribute is attached to the document by the attribute attaching unit 6. The attribute attaching unit 6, referring to the document attribute stored in the attribute storing unit 5, displays the document attribute item value inputting screen shown in FIG. 4 on the display apparatus 8, and stores the attribute ID of the document attribute selected by the user in the bibliographic information table. As a result of the above operation, the document attribute is attached to the document.

The item value inputting unit 11 stores in the bibliographic information table, the item values of the document attribute inputted by the user through the attribute value inputting screen shown in FIG. 5.

In the case that the user does not make a selection of the document attribute, the documents control apparatus may automatically attach a prescribed document attribute. The documents control apparatus may not attach any document attribute to the document in this case, and can handle the document as one without the document attribute.

Figure 9:
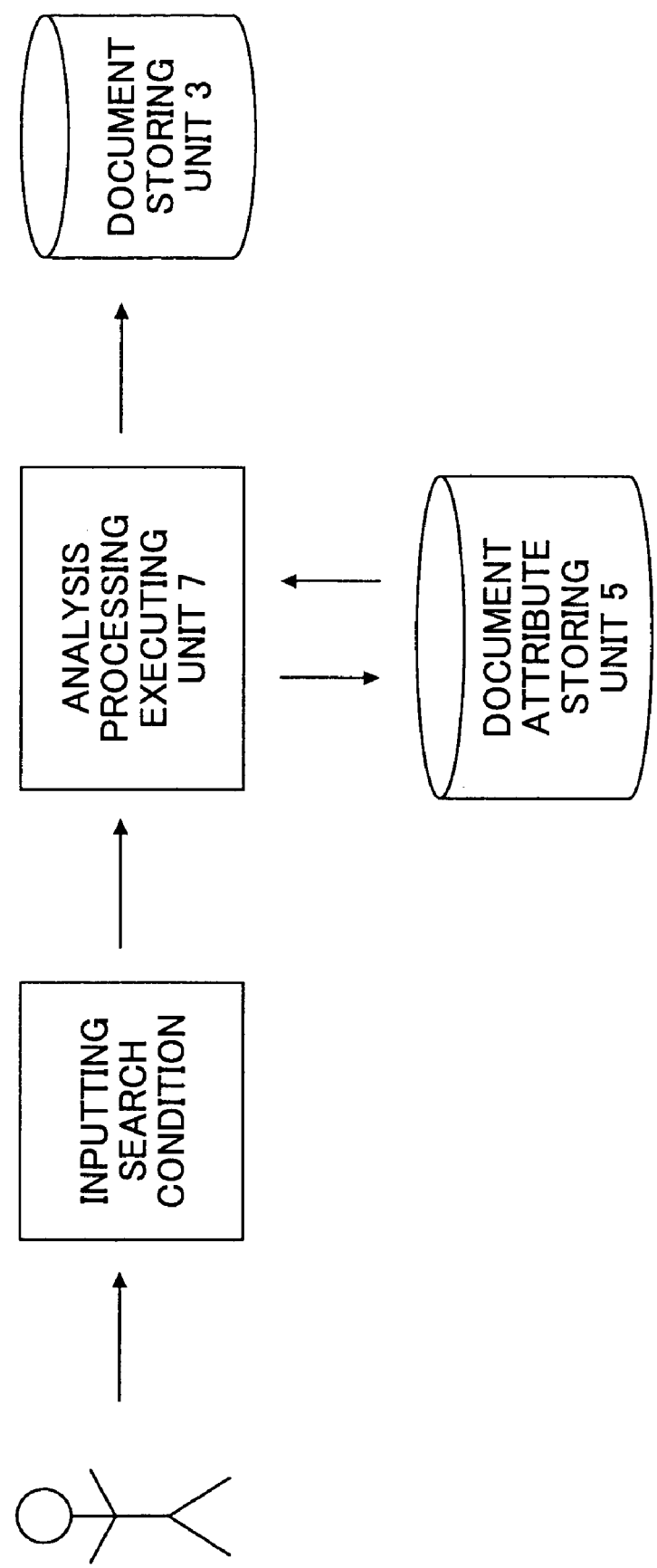
FIG. 9 is a schematic diagram showing analysis processing of the documents control apparatus of FIG. 1.

FIG. 9 is a schematic diagram for explaining analysis processing of a document. Based on a search condition inputted by the user, the analysis processing executing unit 7 searches a document that satisfies the search condition and displays the search result on the display apparatus 8. The analysis processing executing unit 7 interprets the search condition inputted by the user by referring to the attribute storing unit 5.

In a case of a search condition in which the attribute name is "scanner" and the registration date is "on or before Mar. 31, 1988", for example, the analysis processing executing unit 7 refers to the document attribute control data table stored in the attribute storing unit 5 (see FIG. 6A) and determines that the attribute ID of the attribute name "scanner" is "B41-0F32". The analysis processing executing unit 7 further refers to the attribute detailed information table of the attribute name "scanner" (see FIG. 6B) stored in the attribute storing unit 5, and determines that the item value storage number of the item name "registration date" is "D-1".

Based on the above determination, the analysis processing executing unit 7 refers to the bibliographic information table of each document stored in the document storing unit 3, and identifies the documents whose attribute ID is "B41-0F32" and the contents of "D-1" is "on or before Mar. 31, 1988".

As a result, the document "A" (the document name "doc 1") whose bibliographic information table is shown in FIG. 7, for example, is identified as a document satisfying the search condition.

Processing of the documents control apparatus according to an exemplary embodiment of claim 1 is described below.

Depending on the "shared" flag of the document attribute control data table shown in FIG. 6A stored in the attribute storing unit 5, the controlling unit 2 of the documents control apparatus switches edit processing of the attribute editing unit 4. That is, depending on whether the documents control apparatus shares the document attribute with another document control apparatus, the attribute editing unit 4 executes different editing processing.

If the documents control apparatus does not share the document attribute with another documents control apparatus, the attribute editing unit 4 of the documents control apparatus can execute all edit processing including: deleting an attribute, changing attribute name, adding and deleting an item, changing item name, changing an item type, and changing an item value storage number, for example.

If a plurality of documents having the same document attribute has the same item value storage number of the bibliographic information table of the attribute storing unit 5, the bibliographic information has the same items. That is, the value of the item value storage number "C-1" of the document of which attribute ID is "B41-0F32 is "document name". Accordingly, a search based on the bibliographic information can be performed efficiently and consistently.

In the case of "deleting an item", "changing an item type", and "changing item value storage number", each documents control apparatus changes the attribute ID in order to maintain the consistency.

In the case that the attribute ID is changed, the bibliographic information tables of all documents are changed (Only the bibliographic information table of document A is shown in FIG. 7).

In the case of the other attribute edit processing such as "changing an attribute name", "adding an item", and "changing an item name", the attribute ID may be changed or may not be changed.

Figure 10:
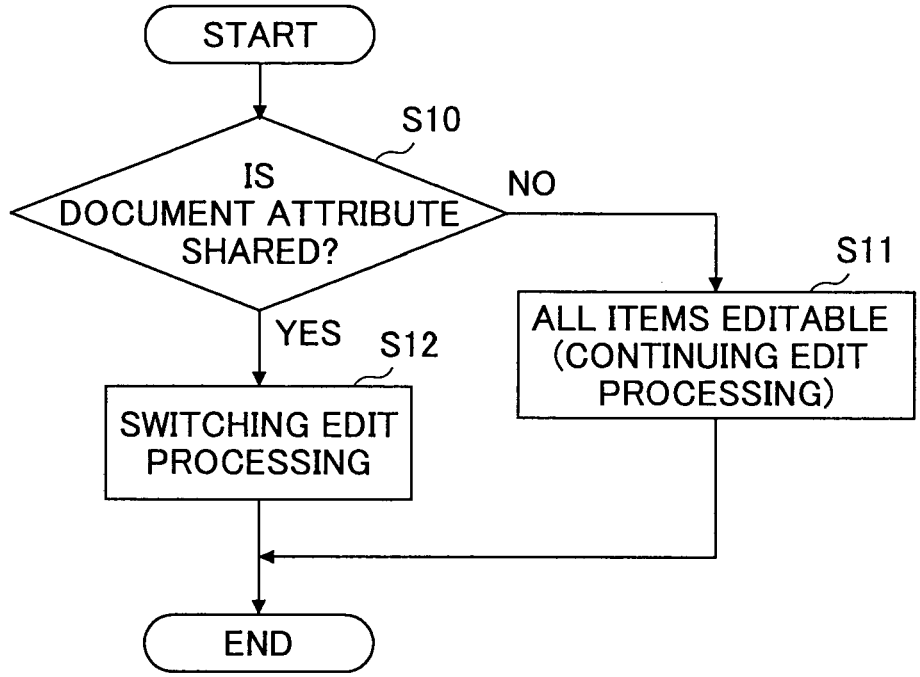
FIG. 10 is a flow diagram of edit processing of the documents control apparatus according to an exemplary embodiment of claim 1.

FIG. 10 is a flow chart showing edit processing of a documents control apparatus according to claim 1.

The controlling unit 2 of the documents control apparatus, when the user gives an instruction through an operation of the input device 9 to start edit processing, determines whether the document attribute is shared with another documents control apparatus using the document attribute control data table shown in FIG. 6A (step S10).

If the controlling unit 2 determines that the document attribute is not shared with another documents control apparatus, then the controlling unit 2 determines that all edit processing is executable without any restriction, and allows the attribute editing unit 4 to execute the edit processing (step S11).

If the controlling unit 2 determines that the document attribute is shared with another documents control apparatus, then the controlling unit 2 switches the edit processing of the document attribute (step S12).

As described above, depending on whether the document attribute is shared with another documents control apparatus, the attribute editing unit 4 switches the edit processing.

Accordingly, the documents control apparatus can edit the document attribute without breaking the sharing relationship with another documents control apparatus. That is, the user is not allowed to edit the document attribute to the extent in which the sharing relationship can not been sustained. Accordingly, a plurality of documents control apparatuses can share the document attribute.

Processing of the documents control apparatus according to an exemplary embodiment of claim 2 is described below.

If a document attribute is shared with another documents control apparatus, the attribute editing unit 4 of the documents control apparatus avoids changing the attribute ID. The user is prohibited from editing the document attribute in the Graphical User Interface (GUI), for example.

Figure 11:
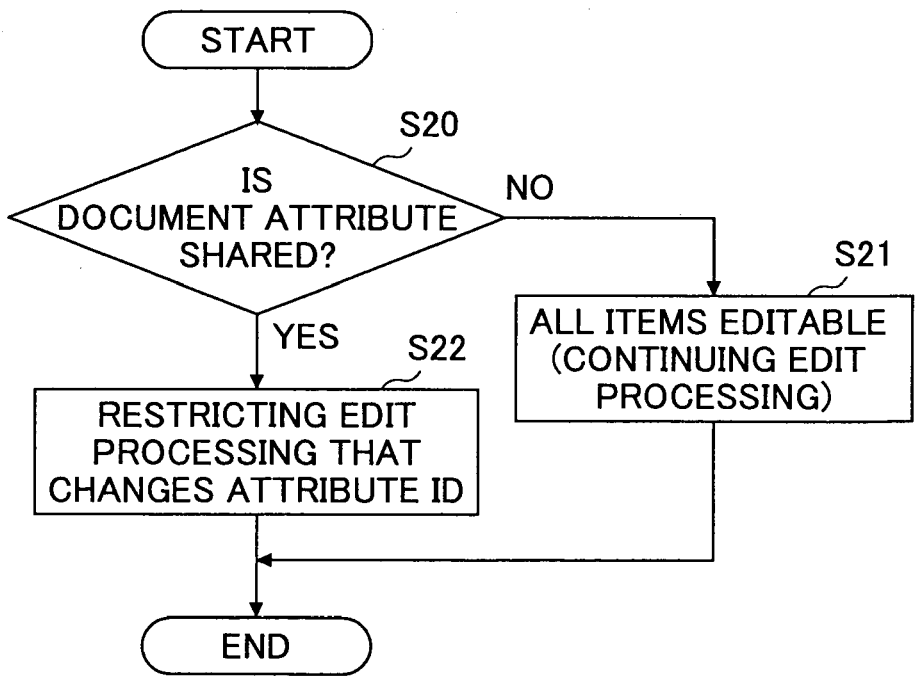
FIG. 11 is a flow diagram of edit processing of the documents control apparatus according to an exemplary embodiment of claim 2.

FIG. 11 is a flow chart showing edit processing of a documents control apparatus according to an exemplary embodiment of claim 2.

No description of steps S20 and S21 is given because they are identical to steps S10 and S11 shown in FIG. 10.

If the controlling unit 2 determines that the document attribute is shared with another documents control apparatus, then the controlling unit 2 inhibits the edit processing that changes the attribute ID (step S22).

As described above, since the attribute editing unit 4 of the documents control apparatus is prevented from changing the attribute ID of the document attribute shared with another documents control apparatus, the documents control apparatus according to claim 2 exhibits the same effect as that of claim 1.

Processing of the documents control apparatus according to an exemplary embodiment of claims 3 and 7 is described below.

In the case in which the input signal from the input device 9 selects the document attribute shared with another documents control apparatus and requests the edit of the document attribute, the controlling unit 2 of the documents control apparatus displays a message and lets the user know that the sharing relationship is no longer sustained. The user has an opportunity to make a decision whether to continue or cancel the edit processing.

Although only a logical value, "YES" or "NO", is indicated in the "shared" column of the document attribute control data table shown in FIG. 6A, the name (information to identify a documents control apparatus) of documents control apparatuses, for example, that share the document attribute may instead be indicated. In this case, the documents control apparatus needs to attach its name (or other identification information) to the document attribute retained in the document attribute control data table in advance.

When copying the document attribute stored in another documents control apparatus so as to share the document attribute, the controlling unit 2 of the documents control apparatus recognizes the name of the documents control apparatus by referring to the document attribute, and writes the name in the "shared" column of the document attribute control data table.

In the case that three or more documents control apparatuses share the same document attribute, the controlling unit 2 of each documents control apparatus writes and retains the names of the other documents control apparatuses in the "shared" column of the document attribute control data table. In this case, if a new documents control apparatus starts sharing the same document attribute that is already shared among a plurality of documents control apparatuses, the controlling unit 2 of the new documents control apparatus informs all the other documents control apparatuses sharing the same document attribute that the new documents control apparatus starts sharing the same document attribute. Accordingly, the controlling unit 2 of the document controlling apparatus displays the names of the other documents control apparatuses retained in the "shared" column of the document attribute control data table on the display apparatus 8 to let the user know which documents control apparatus shares the document attribute. The user can appropriately edit and use the document attribute depending on the sharing state of the document attribute.

Figure 12:
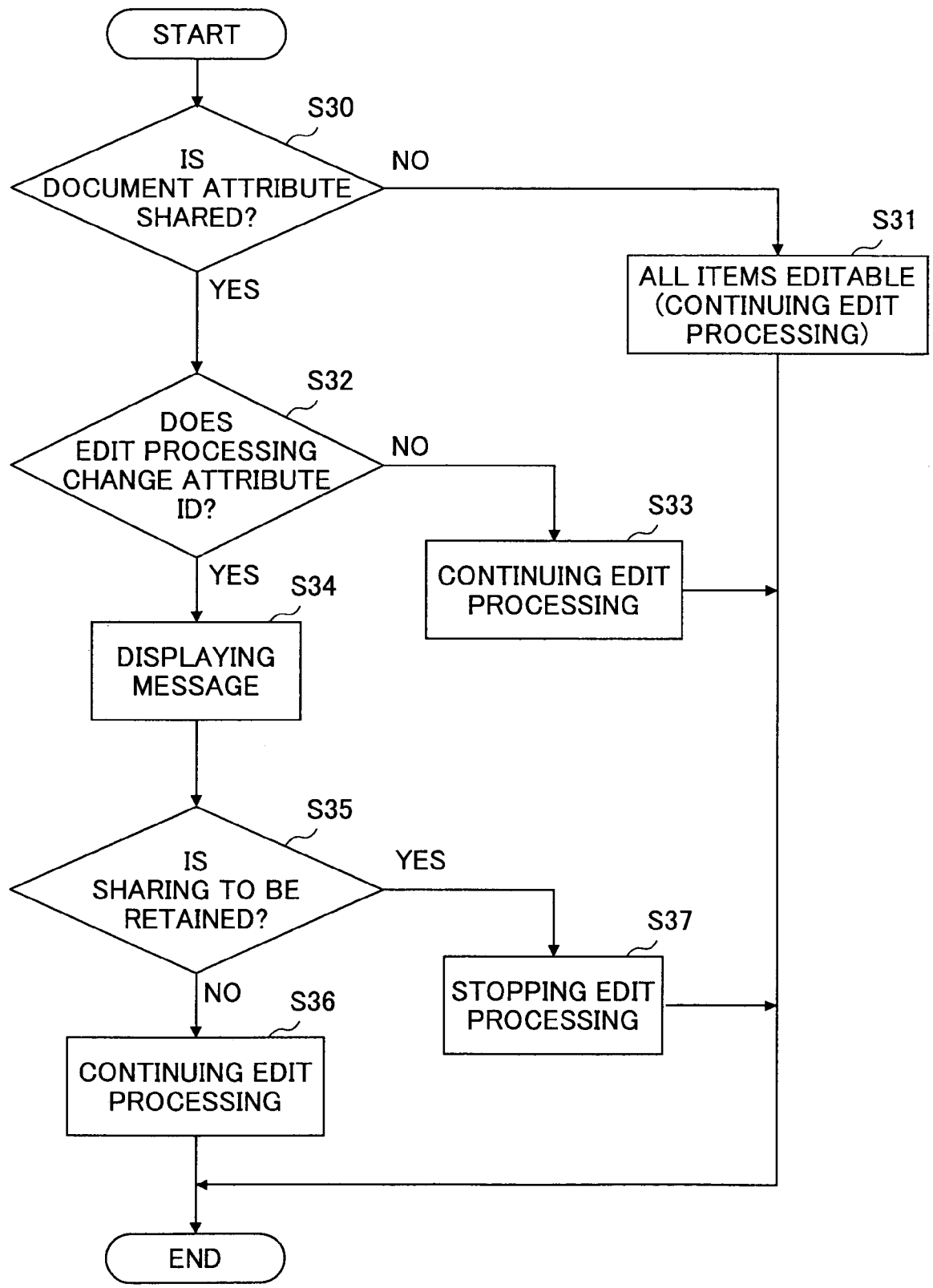
FIG. 12 is a flow diagram of edit processing of the documents control apparatus according to an exemplary embodiment of claim 3.

FIG. 12 is a flow chart showing processing related to the edit of document attribute of the controlling unit 2 of the documents control apparatus according to an exemplary embodiment of claim 3.

When the input device 9 receives an instruction to begin the edit of a document attribute, the controlling unit 2 of the documents control apparatus (editing apparatus) determines whether the document attribute is shared with another documents control apparatus based on the document attribute control data table shown in FIG. 6A (step S30).

If the controlling unit 2 of the editing apparatus determines that the document attribute is not shared by the other documents control apparatuses, the controlling unit 2 of the editing apparatus determines that all attribute edit processing is executable, and allows the attribute editing unit 4 of the editing apparatus to continue attribute edit processing (step S31).

If the controlling unit 2 of the editing apparatus determines that the document attribute is shared by the other documents control apparatuses (sharing apparatuses), the controlling unit 2 of the editing apparatus further determines whether the requested attribute edit processing requires the change in attribute ID (step S32).

If the change in attribute ID is not required, the controlling unit 2 of the editing apparatus allows the attribute editing unit 4 to proceed (step S33). If the change in attribute ID is required, the controlling unit 2 displays a message on the display apparatus 8 to let the user know that the change in attribute ID is required (or that the sharing relationship may be no longer sustained with the sharing apparatuses (step S34). The controlling unit 2 of the editing apparatus displays a message on the display apparatus 8 and enquires the user whether to sustain the sharing relationship of the document attribute.

In response to the message displayed on the display apparatus 8, the user can select whether to sustain the sharing relationship with the sharing apparatuses by operating the input device 9 (step S35).

In the case that the user selects not to sustain the sharing relationship with the sharing apparatuses, the controlling unit 2 of the editing apparatus allows the attribute editing unit 4 to proceed (step S36).

In the case that the user selects to sustain the sharing relationship with the sharing apparatuses, the controlling unit 2 of the editing apparatus causes the attribute editing unit 4 to stop the requested attribute edit processing of the document attribute (step S37).

As described above, in the case that the attribute editing unit 4 of the editing apparatus performs edit processing in which the attribute ID of document attribute shared with the sharing apparatuses is changed, the controlling unit 2 of the editing apparatus displays the messages to draw attention of the user. The user can make a decision whether or not to sustain the sharing relationship of the document attribute. That is, the user can edit the document attribute with the sharing relationship with the sharing apparatuses sustained, or the user can edit the document attribute without sustaining the sharing relationship with the sharing apparatuses.

Processing of the documents control apparatus according to an exemplary embodiment of claim 4 is described below.

In the case that the attribute editing unit 4 of a documents control apparatus (editing apparatus) executes attribute edit processing that changes attribute ID of document attribute shared with the other documents control apparatuses (sharing apparatuses), the controlling unit 2 of the editing apparatus informs, via the network, all the sharing apparatuses that it starts the attribute edit processing of the document attribute. In the case that all the sharing apparatuses give the editing apparatus permission, the controlling unit 2 of the editing apparatus allows the attribute editing unit 4 to execute attribute edit processing that changes the attribute ID of the document attribute.

On the other hand, if there is no access to the document attribute and there is no document to which the document attribute is assigned, the sharing apparatuses, in response to reception of the information that the editing apparatus starts attribute edit processing of the document attribute, give the editing apparatus permission to start the attribute edit processing.

As described above, in the case that the controlling unit 2 of the editing apparatus receives permission for starting attribute edit processing from all the sharing apparatuses, the controlling unit 2 of the editing apparatus causes the attribute editing unit 4 to start the attribute edit processing of the document attribute. The controlling unit 2 of the editing apparatus informs the sharing apparatuses of the contents of the attribute edit processing so that the sharing apparatuses can duplicate the same attribute edit processing of the document attribute simultaneously.

The sharing apparatuses, in response to reception of the information of the contents of the edit processing, execute the same attribute edit processing. After completing the attribute edit processing, the sharing apparatuses inform the editing apparatus of the completion.

When all the sharing apparatuses inform the editing apparatus of the completion of the same attribute edit processing, the controlling unit 2 of the editing apparatus finishes the attribute edit processing.

Figure 13:
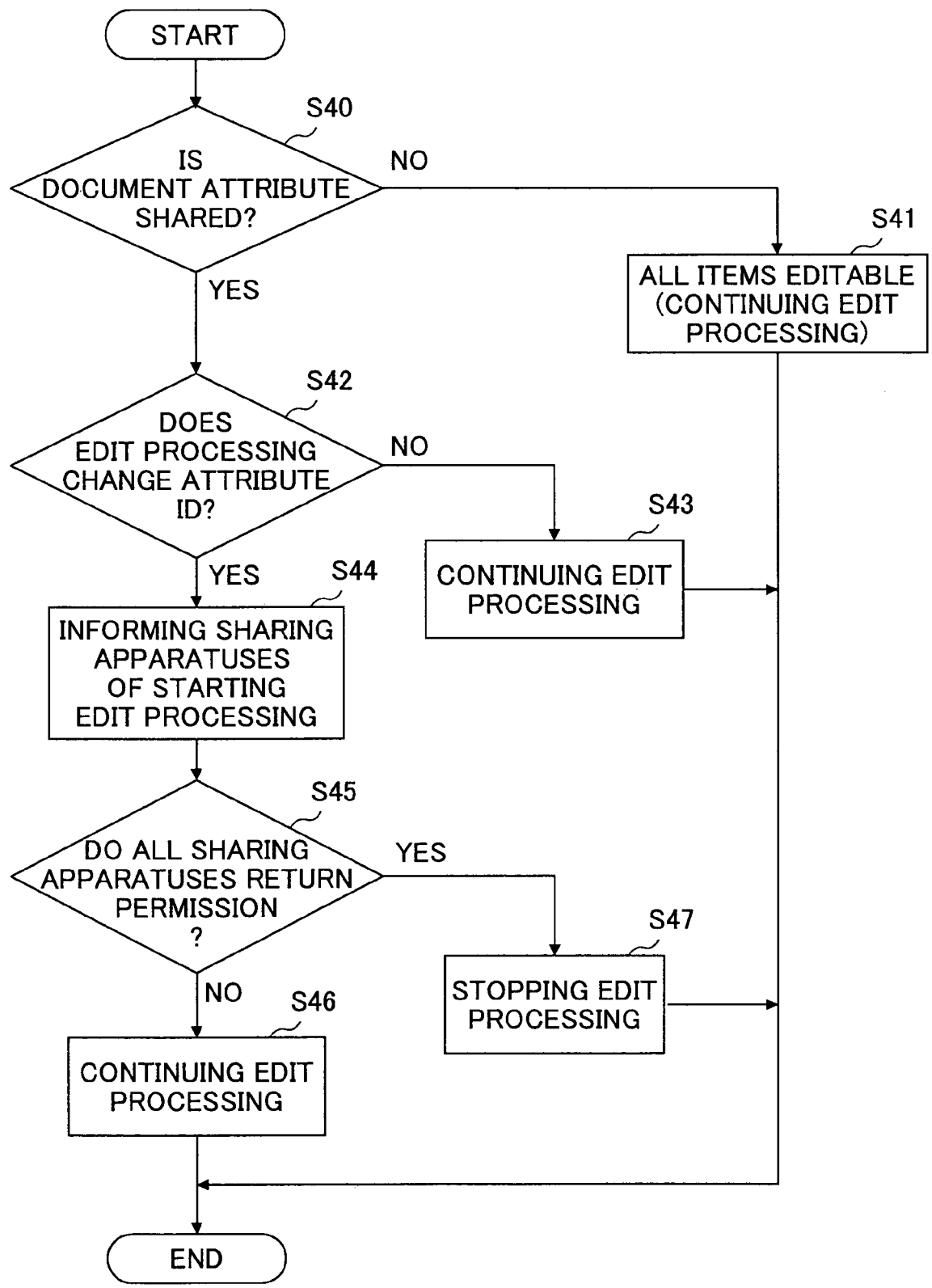
FIG. 13 is a flow diagram of edit processing of the documents control apparatus according to an exemplary embodiment of claim 4.

FIG. 13 is a flow chart showing edit processing of a documents control apparatus according to an exemplary embodiment of claim 4.

No description of steps S40–S43 is given since they are identical to steps S30–S33 shown in FIG. 12.

If the controlling unit 2 of the documents control apparatus determines that the document ID is shared with another documents control apparatus in step S42, the controlling unit 2 informs the sharing apparatuses that the editing apparatus starts the edit processing that changes the document ID (step S44). The controlling unit 2 determines whether all sharing apparatuses have refused permission to change the attribute ID (step S45), and if all the sharing apparatuses have returned such permission, the controlling unit 2 causes the attribute editing unit 4 to start the edit processing (step S46). If any one of the sharing apparatuses does not return the permission, the controlling unit 2 causes the attribute editing unit 4 to stop the edit processing (step S47).

As described above, in the case that the attribute editing unit 4 of the editing apparatus executes attribute edit processing in which the identification information of the shared document attribute is changed, the controlling unit 2 of the editing apparatus informs the sharing apparatuses of the contents of attribute edit processing so that the sharing apparatuses can execute the same attribute edit processing.

The user of the editing apparatus can edit the document attribute with the sharing relationship sustained.

Processing of the documents control apparatus according to an exemplary embodiment of claim 5 is described below.

In the case that the attribute editing unit 4 of the editing apparatus executes attribute edit processing in which the identification information of the shared document attribute is changed, the controlling unit 2 of the editing apparatus generates history information about attribute edit processing (attribute edit history information), stores it in edit history storing unit 10 as an attribute edit history file, and then transmits the attribute edit history file to the sharing apparatuses via the network.

In response to reception of the attribute edit history file, the sharing apparatuses execute the same attribute edit processing as that of the editing apparatus (reflection processing) based on the attribute edit history file. If there is a plurality of attribute edit history files in connection with a document attribute, the reflection processing of the plurality of attribute edit history files is executed one by one in the order of date of creation (assuming the date of creation is included in the attribute edit history file).

Figure 14:
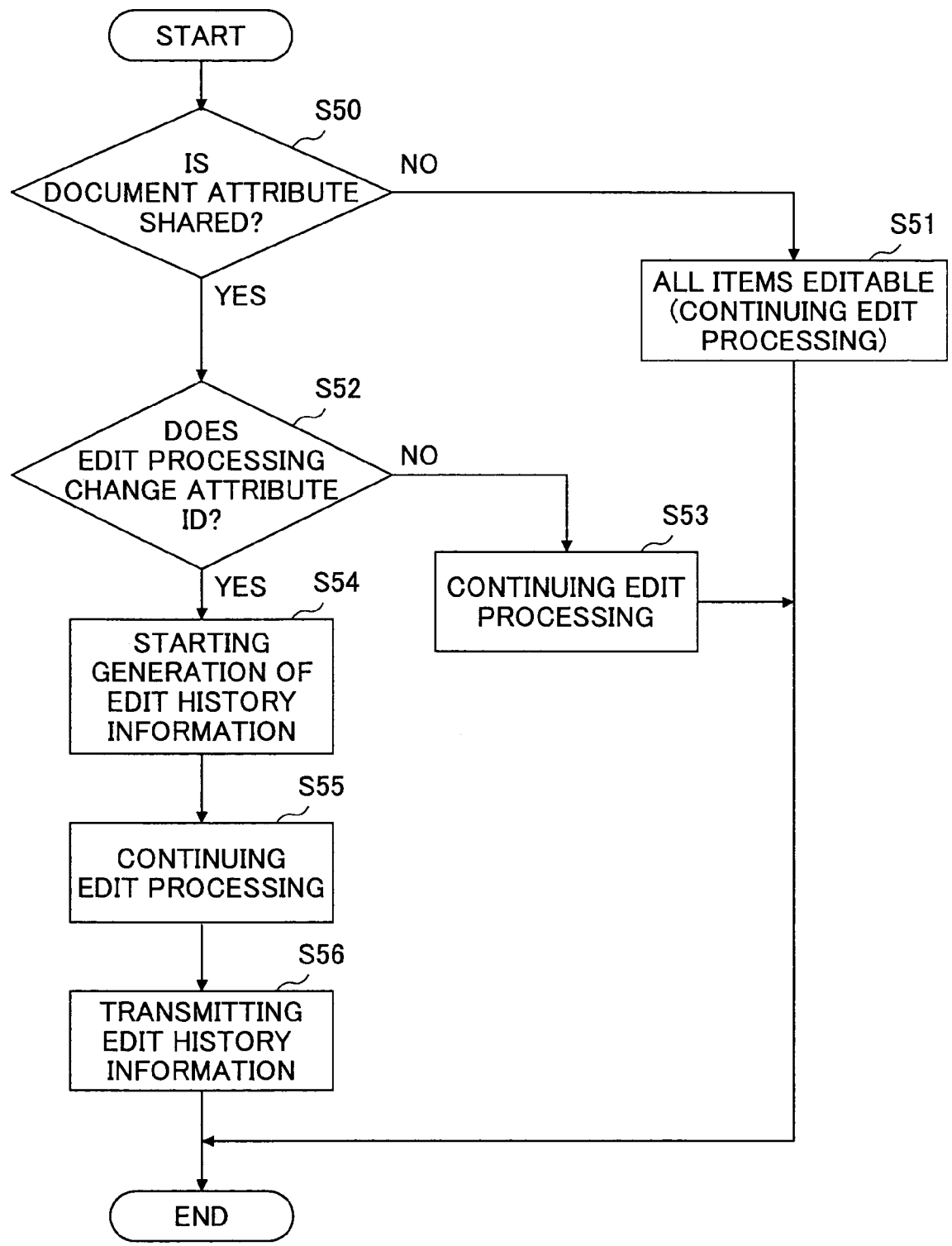
FIG. 14 is a flow diagram of edit processing of the documents control apparatus according to an exemplary embodiment of claim 5.

FIG. 14 is a flow chart showing edit processing of a documents control apparatus according to an exemplary embodiment of claim 5.

No description of steps S50–S53 is given because they are identical to steps S30–S33 shown in FIG. 12.

If a determination is made in step S52 that the attribute ID needs to be changed, the controlling unit 2 gives an instruction to the edit history storing unit 10 to generate attribute edit history information in connection with the edit processing (step S54). The edit history storing unit 10, in response to the instruction, starts accumulating the attribute edit history information. The controlling unit 2 causes the attribute editing unit 4 to start the edit processing (step S55). When the edit processing is over, the controlling unit 2 retrieves the attribute edit history information stored in the edit history storing unit 10, and transmits it to each sharing apparatus via the network (step S56).

FIG. 15 illustrates the attribute edit history information. This is the case in which the attribute "abc" shown in FIG. 2 is modified to the attribute "xyz" shown in FIG. 3, for example.

The attribute ID of the edited document attribute is recorded in the first line of the attribute edit history information. The date and time of the edit processing, "10:00AM, Jun. 9, 2003" and the contents of the edit processing at that time are recorded in the second line of the attribute edit history information. This record indicates the attribute name is changed from "abc" to "xyz". In the third line, the date and time of the edit processing and the content thereof are indicated. Specifically, the name of "ITEM 1" was changed from "PRINT DATE" to "FINAL PRINT DATE" at "10:21 AM, Jun. 9, 2003".

As described above, in the case that the attribute editing unit 4 of the editing apparatus executes attribute edit processing in which the identification information of the shared document attribute is changed, the controlling unit 2 of the editing apparatus creates the edit history information about edit processing, and transmits the edit history information to the sharing apparatuses. Accordingly, the user of the editing apparatus can edit the document attribute with the sharing relationship with the sharing apparatuses sustained.

Processing of the documents control apparatus according to an exemplary embodiment of claim 6 is described below.

The controlling unit 2 of the documents control apparatus, even in the case where an edit processing that changes the attribute ID of the document attribute shared with another documents control apparatus is requested, does not change the attribute ID and continuously uses the same attribute ID. In this case, the consistency of the bibliographic information cannot be sustained after the edit processing. However, since the documents still have the same document attribute, the documents can be identified and handled by the same document attribute.

Figure 16:
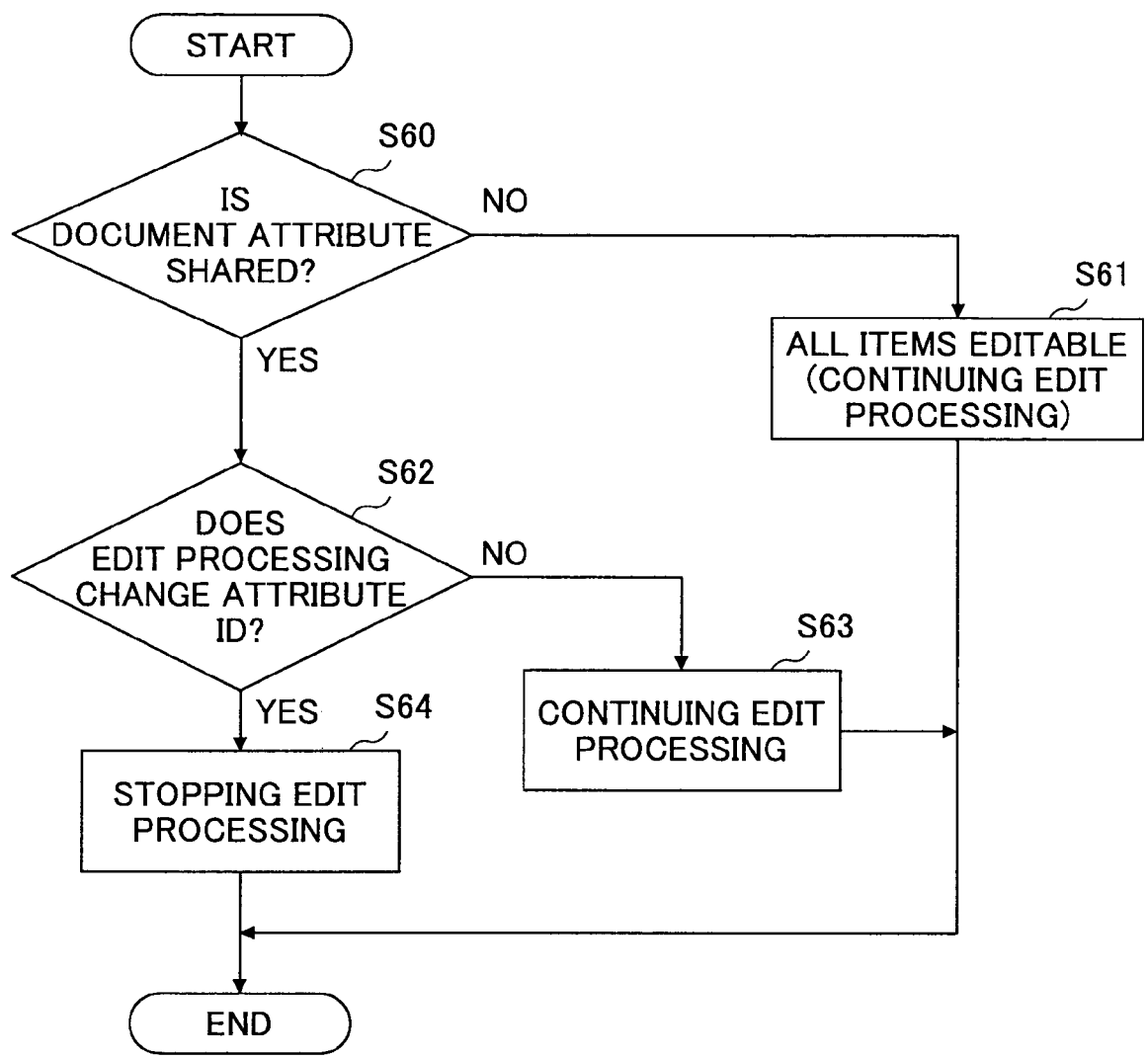
FIG. 16 is a flow diagram of edit processing of the documents control apparatus according to an exemplary embodiment of claim 6.

FIG. 16 is a flow chart showing edit processing of a documents control apparatus according to an exemplary embodiment of claim 6.

No description is given of steps S60–S63 because they are identical to steps S30–S33 shown in FIG. 12. If a determination is made that the edit processing requires the attribute ID be changed in step S62, the controlling unit 2 causes the attribute editing unit 4 to stop the edit processing of the document attribute (step S64).

As described above, in the case that edit processing in which the attribute ID of the shared document attribute is to be changed is designated, the controlling unit 2 of the editing apparatus prevents the attribute ID from being changed. Accordingly, when a document is copied or moved to another documents control apparatus, the bibliographic information of the document becomes inconsistent, but the document ID of the document attribute attached to the copied document remains consistent. As a result, the user can edit the document attribute with the sharing relationship sustained. The user cannot edit the document attribute in a manner that the sharing relationship is lost.

In addition, it is possible to develop a computer program that causes a computer to perform various functions of the documents control apparatus according to the present invention and a computer readable recording medium storing the computer program. The functions include the documents controlling unit, the attribute attaching unit, the item type defining unit, the name attaching unit, the item value inputting unit, the edit processing unit, the document copying unit, the attribute sharing unit, the attribute identification information setting unit, the switching unit, the display unit, the edit processing informing unit, the edit history information generating unit, and the edit history information transmitting unit, for example.

An ordinary personal computer can function as the documents control apparatus according to the present invention by installing the computer program into a storage device such as an internal hard disk drive reading the computer program using a CD-ROM drive or a DVD-ROM drive, for example.

In summary, the documents control apparatus according to the present invention can edit the document attribute with the sharing relationship of the document attribute sustained. The documents control apparatus can alternatively prohibit the user to edit the document attribute in a manner that the sharing relationship is lost.

The preferred embodiments of the present invention are described above. The present invention is not limited to these embodiments, but various variations and modifications may be made without departing from the scope of the present invention.

This patent application is based on Japanese priority patent applications No. 2002-183347 filed on Jun. 24, 2002, and No. 2003-172487 file on Jun. 17, 2003, the entire contents of which are hereby incorporated by reference.

What is claimed is:

1. A documents control apparatus that can share with another documents control apparatus an attribute attached to a document, comprising:

an attribute sharing unit configured to share said attribute attached to the document with said other documents control apparatus;

an edit processing unit configured to edit process said attribute;

a switching unit configured to determine whether said attribute is shared with said other documents control apparatus by said attribute sharing unit and, based on the determination by said switching unit, configured to control edit processing on said attribute by said edit processing unit;

a documents controlling unit configured to control documents;

an attribute attaching unit configured to attach said attribute to each document controlled by said documents controlling unit, said attribute including an item type, a name of said item type, and an item type value; and an item type defining unit configured to assign one or more item types to said attribute attached to each document by said attribute attaching unit.

2. The documents control apparatus as claimed in claim 1, further comprising:

an attribute identification information setting unit configured to set attribute identification information of said attribute for identifying said attribute; and an inhibiting unit configured to determine whether, if said attribute is edited by said edit processing unit, said attribute identification information setting unit needs to change said attribute identification information set for identifying said attribute, and, based on the determination by said inhibiting unit, is configured to cause said edit processing unit to not edit said attribute.

3. The documents control apparatus as claimed in claim 1, further comprising:

an attribute identification information setting unit configured to set attribute identification information of said attribute for identifying said attribute; and a displaying unit configured to indicate whether the edit processing by said edit processing unit changes said attribute identification information of said attribute.

4. The documents control apparatus as claimed in claim 1, further comprising:

an attribute identification information setting unit configured to set attribute identification information of said attribute for identifying said attribute; and an edit processing informing unit configured to inform, if edit processing by said edit processing unit changes said attribute identification information of said attribute, said other documents control apparatus of information of said edit processing so that said other documents control apparatus can execute an identical edit processing on said attribute.

5. The documents control apparatus as claimed in claim 1, further comprising:

an attribute identification information setting unit configured to set attribute identification information of said attribute for identifying said attribute;

an edit history information generating unit configured to generate, if edit processing by said edit processing unit changes said attribute identification information of said attribute, edit history information of said edit processing; and an edit history information transmitting unit configured to transmit said edit history information to said other documents control apparatus.

6. The documents control apparatus as claimed in claim 5, further comprising a document attribute edit history storing unit that, when said edit processing changes said attribute identification information of said attribute is configured to store said edit history information of said edit processing.

7. The documents control apparatus as claimed in claim 1, further comprising an attribute identification information setting unit configured to set attribute identification information of said attribute for identifying said attribute;
wherein said edit processing unit, if edit processing by said edit processing unit that changes said attribute identification information of said attribute is requested, is configured to prevent said attribute from changing.

8. The documents control apparatus as claimed in claim 1, further comprising:
a name attaching unit configured to attach a name to said item type defined by said item type defining unit; and
a document copying unit configured to copy said document to said other documents control apparatus.

9. The documents control apparatus as claimed in claim 8, further comprising an attribute storing unit configured to store said attribute, said item type, the name of said item type, and said item type value.

10. The documents control apparatus as claimed in claim 9, wherein said edit processing unit is configured to retrieve and edit said attribute, said item type, the name of said item type, and said item value stored in said attribute storing unit.

11. The documents control apparatus as claimed in claim 9, wherein said attribute attaching unit is configured to correlate said document controlled by said documents controlling unit with an attribute retrieved from said attribute storing unit.

12. The documents control apparatus as claimed in claim 11, wherein said document controlling unit is configured to store said document and said correlated attribute.

13. The documents control apparatus as claimed in claim 9, wherein said attribute storing unit is further configured to store information indicating reference to said attribute, said item type, the name of said item type, and said item value.

14. The documents control apparatus as claimed in claim 9, wherein said attribute storing unit is further configured to store information related to an item included in said attribute.

15. The documents control apparatus as claimed in claim 14, wherein said attribute storing unit is further configured to store information indicating correlation between said item included in said attribute and location in which said item is stored.

16. The documents control apparatus as claimed in claim 8, further comprising an analysis processing unit configured to retrieve said documents from said documents controlling unit and configured to analyze said retrieved documents based on designated condition.

17. The documents control apparatus as claimed in claim 1, further comprising an attribute shared by said attribute sharing unit with said other documents control apparatus, the attribute including information for identifying said other documents control apparatus.

18. A documents control system, comprising a plurality of documents control apparatuses connected via a network, the plurality of documents control apparatus being as claimed in claim 1.

19. The document control apparatus according to claim 1, wherein the item type defining unit includes:
a graphical user interface configured to display the attributes and the attribute item types for manual modification of the attribute items types.

20. A computer readable recording medium, storing a computer program that causes a computer to function as:
an attribute sharing unit configured to share an attribute with a documents control apparatus;
an edit processing unit configured to switch depending on whether said attribute sharing unit shares said attribute with said documents control apparatus, edit processing on said attribute;
a documents controlling unit configured to control documents;
an attribute attaching unit configured to attach said attribute to each document controlled by said documents controlling unit, said attribute including an item type, a name of said item type, and an item type value; and
an item type defining unit configured to assign one or more item types to said attribute attached to each document by said attribute attaching unit.

21. The computer readable recording medium according to claim 20, wherein the computer program stored on the computer readable recording medium further causes a computer to function as:
a graphical user interface configured to display the attributes and the attribute item types for manual modification of the attribute items types.

22. A method of controlling an attribute of a document comprising:
controlling documents;
receiving a request for edit processing on an attribute;
determining whether said attribute is shared among a plurality of documents control apparatuses and, if so shared, whether said edit processing changes attribute identification information of said attribute;
attaching attributes to each document controlled by the controlling, the attributes including an item type, a name of the item type, and an item type value;
defining item types by assigning one or more types to said attribute attached to each document by said attribute attaching unit; and
switching over, if said attribute is shared among the plurality of documents control apparatuses and said edit processing changes attribute identification information of said attribute, said edit processing to an edit processing that does not change said attribute identification information.

* * * * *